Figure 1:
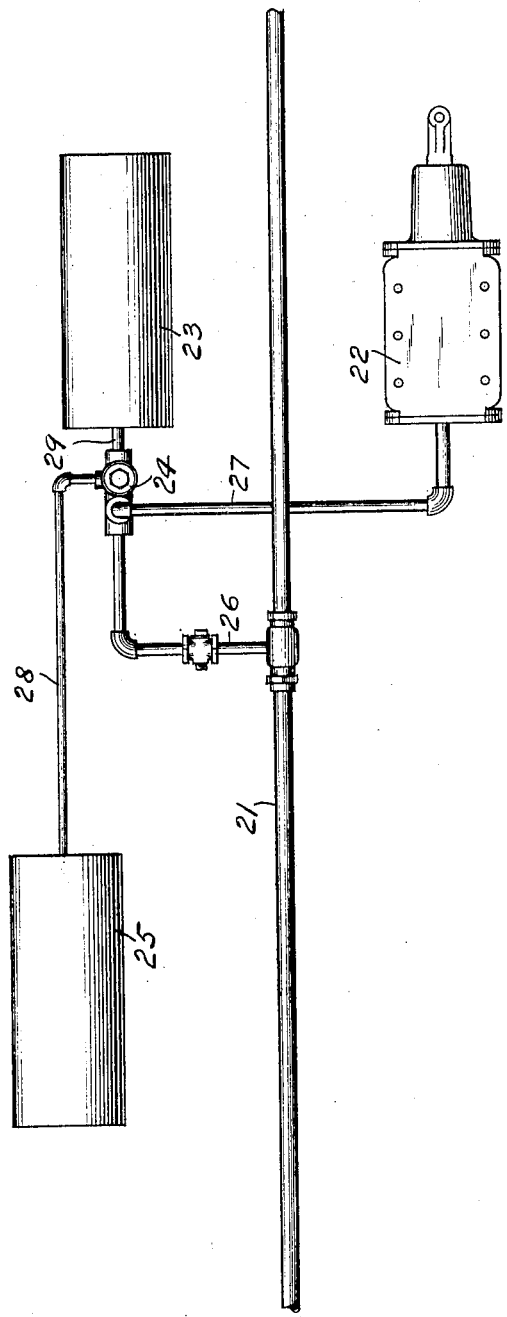

No. 869,592. PATENTED OCT. 29, 1907.
R. A. PARKE.
FLUID PRESSURE BRAKE.
APPLICATION FILED AUG. 1, 1902.

4 SHEETS—SHEET 1.

WITNESSES:
Jas. B. MacDonald.
J. S. Custer

INVENTOR,
Robert A. Parke
By E. Wright
Att'y.

No. 869,592. PATENTED OCT. 29, 1907.
R. A. PARKE.
FLUID PRESSURE BRAKE.
APPLICATION FILED AUG. 1, 1902.
4 SHEETS—SHEET 2.
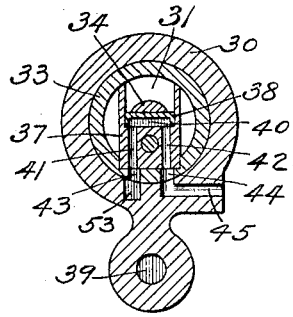
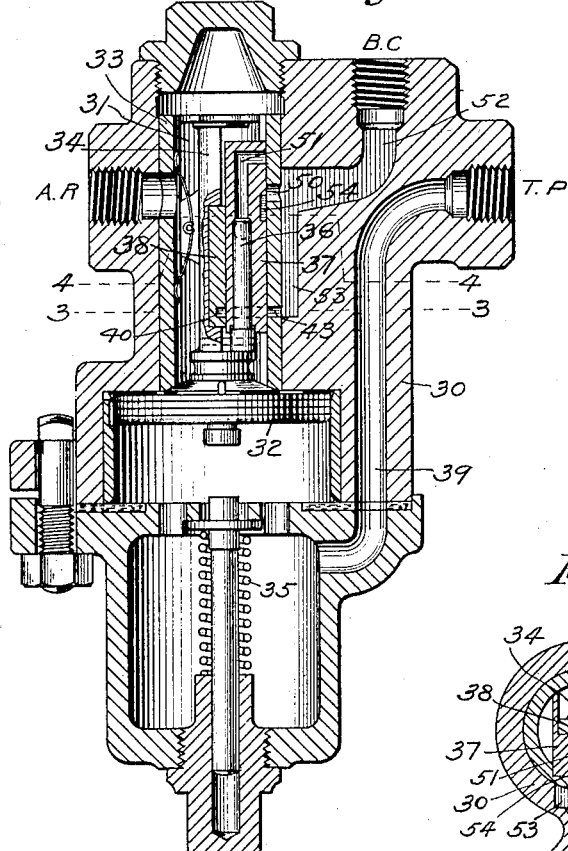
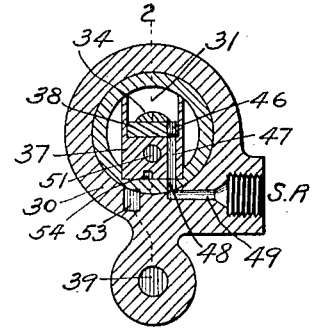
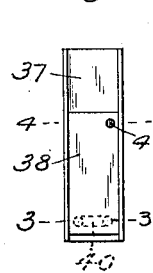
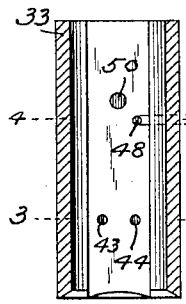
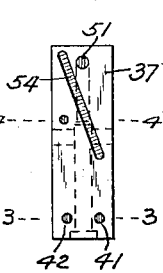
WITNESSES:
Jas. B. MacDonald
J. S. Custer
INVENTOR,
Robert A. Parke
By E. Wright
Att'y.

No. 869,592. PATENTED OCT. 29, 1907.
R. A. PARKE.
FLUID PRESSURE BRAKE.
APPLICATION FILED AUG. 1, 1902.
4 SHEETS—SHEET 3.
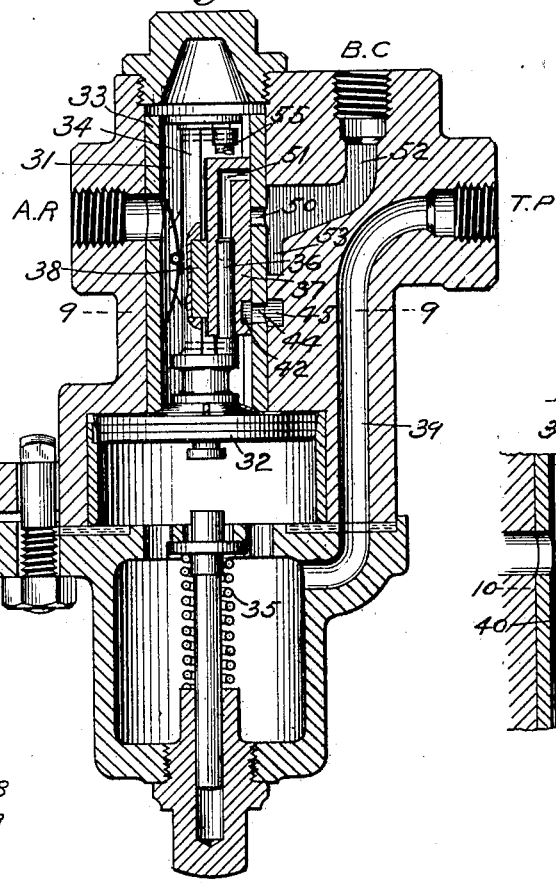
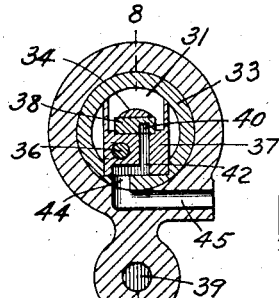
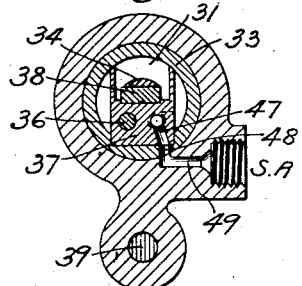
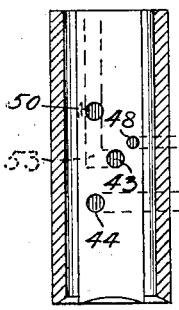
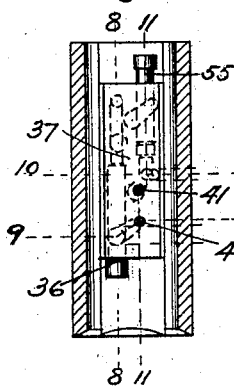
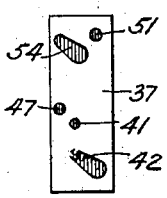
WITNESSES:
Jas. B. MacDonald
INVENTOR,
Robert A. Parke
By E. Wright Att'y.

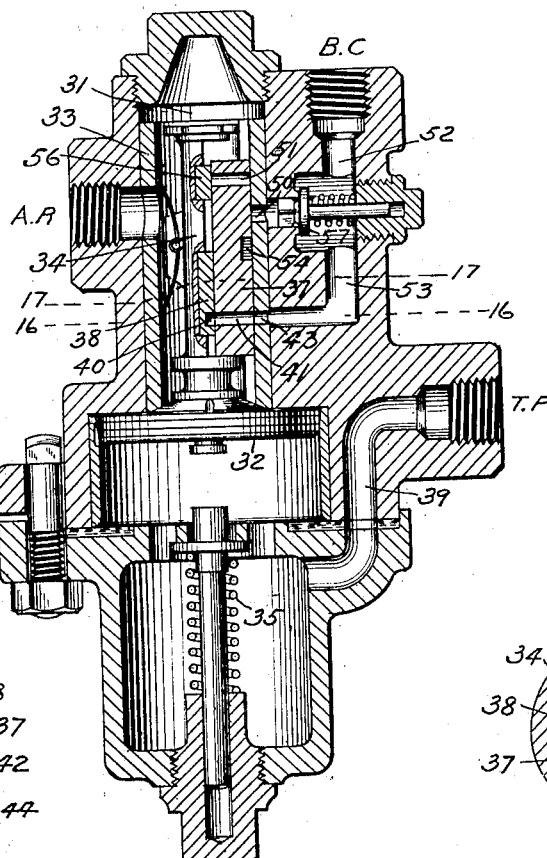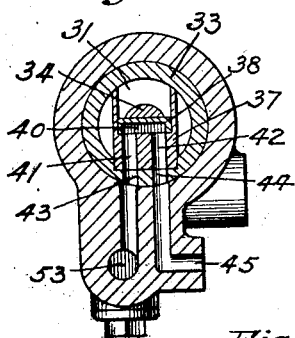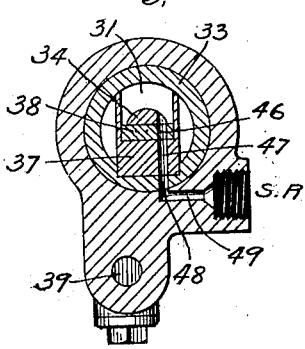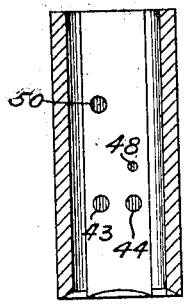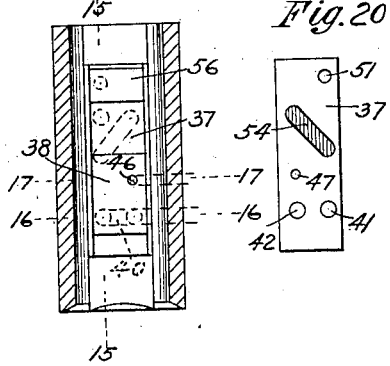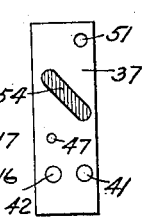

UNITED STATES PATENT OFFICE.

ROBERT A. PARKE, OF NEW YORK, N. Y., ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 869,592.      Specification of Letters Patent.      Patented Oct. 29, 1907.

Application filed August 1, 1902. Serial No. 117,945.

*To all whom it may concern:*

Be it known that I, ROBERT A. PARKE, a citizen of the United States, residing in New York city, county of Richmond, and State of New York, have invented a certain new and useful Improvement in Fluid-Pressure Brakes, of which improvement the following is a specification.

This invention relates to an automatic air brake apparatus, and has for its principal object to provide an improved valve device operating in response to variations in fluid pressure and in connection with an additional or supplemental reservoir, or source of air pressure other than the usual auxiliary reservoir, for controlling the release from the brake cylinder, and communication from the additional reservoir, or source of pressure, to the auxiliary reservoir or valve device.

Another object is the provision of means for supplying air from the additional reservoir or source of pressure to the brake cylinder at certain times, as in the case of an emergency application of the brakes.

In the accompanying drawings, Figure 1 is a plan view showing the general arrangement of a fluid pressure brake mechanism embodying my invention; Fig. 2 a vertical section taken on the line 2—2 of Fig. 4, and showing one form of triple valve device which may be employed in the practice of my invention; Fig. 3 a horizontal section taken on the line 3—3 of Figs. 2, 5, 6, and 7; Fig. 4 a horizontal section taken on the line 4—4 of Figs. 2, 5, 6, and 7; Fig. 5 a view of the slide valve seat; Fig. 6 a view of the back of said slide valve; Fig. 7 a view of the face of said slide valve; Fig. 8 a vertical section of another form of my improved triple valve device taken on the line 8—8 of Figs. 9 and 13; Fig. 9 a horizontal section taken on the line 9—9 of Figs. 8 and 13; Fig. 10 a horizontal section taken on the line 10—10 of Figs. 11 and 13; Fig. 11 a vertical section taken on the line 11—11 of Fig. 13; Fig. 12 a view of the slide valve seat; Fig. 13 a similar view showing the slide valve on its seat; Fig. 14 a face view of the slide valve showing ports therein; Fig. 15 a vertical section taken on the line 15—15 of Fig. 19, and showing another modification of my improved triple valve device; Fig. 16 a horizontal section taken on the line 16—16 of Figs. 15 and 19; Fig. 17 a horizontal section taken on the line 17—17 of Figs. 15 and 19; Fig. 18 a view showing the main slide valve seat corresponding to this last modification; Fig. 19 a similar view with the main slide valve in position, and Fig. 20 a face view of the slide valve.

Referring to Fig. 1, the train pipe 21 is connected by branch pipe 26 with the triple valve device 24, which is connected to the auxiliary reservoir 23, supplemental reservoir 25 and brake cylinder 22, by pipes 29, 28, and 27 respectively.

On Sheet 2 of the drawings is illustrated one form of triple valve device comprising the usual casing 30, valve chamber 31, bushing 33, piston 32, stem 34, and spring 35.

In addition to the usual graduating valve 36 in the main slide valve 37, I provide a further auxiliary or graduating valve, which, in this instance, is shown as an auxiliary slide valve 38 mounted to move with the piston stem on the back of the main slide valve and to control additional ports therein leading to the supplemental reservoir, the brake cylinder and to the exhaust.

When the valve is in release position, as shown in the drawings, fluid under pressure from the train pipe enters passage 39 and flows through the feed groove and valve chamber to the auxiliary reservoir, charging the same in the usual manner. At the same time communication is established between the valve chamber and the supplemental reservoir through ports 46, 47, and 48, passage 49 and pipe 28, so that the supplemental reservoir is charged to the same normal pressure as the auxiliary reservoir.

When the train pipe pressure is reduced for the purpose of making a service application of the brakes the piston 32 moves downward carrying with it the graduating valve 36 and auxiliary slide valve 38, so that the first part of the movement causes the cavity 40 in the auxiliary slide valve to move out of register with the ports 41 and 42 of the main slide valve 37 and thus close the exhaust from the brake cylinder. At the same time the service passage 51 in the main slide valve is opened to the valve chamber by means of the graduating valve 36 being withdrawn from its seat, and the feed groove is closed.

As the triple valve piston continues to move downward the head of the stem 34 engages the main slide valve 37 and moves the same to service position, in which the short stem of the piston makes contact with the stem of emergency spring 35 and port 51 registers with port 50 in the valve seat which communicates with the brake cylinder through passage 52 and pipe 27. It will be noticed that the preliminary movement of the auxiliary slide valve 38 on the main slide valve 37 also closes ports 46 and 47 leading to the supplemental reservoir so that there is no discharge from said supplemental reservoir during service applications. Fluid under pressure then flows from the auxiliary reservoir to the brake cylinder until the pressure in the auxiliary reservoir is slightly below that of the train pipe, then the triple valve piston moves up sufficiently to close the graduating valve 36 and cut off the supply to the brake cylinder. Ports 41 and 42 then register with the cavity 40, and port 47 with port 46, but as the main slide valve is not moved these ports are all closed at the main slide valve seat. Further reduction in train pipe pressure may be made in the usual way for increasing the pressure in the brake cylinder. In order to fully and quickly release the brakes the train pipe is recharged rapidly from the main reservoir, thus causing the triple valve to move to its release position and allow the brake cylinder to exhaust to the atmosphere through branch passage 53, ports 43 and 41, cavity 40 in auxiliary slide valve, ports 42 and 44 of the main valve and seat, and exhaust passage 45. At the same time the supplemental reservoir is put in communication with the valve chamber through passage 49, ports 48, 47 and 46, and since the pressure therein is greater than the depleted pressure in the auxiliary reservoir and valve chamber, fluid will flow back into the valve chamber and equalize with the auxiliary reservoir at the same time that fluid under pressure from the train pipe is flowing in through the feed groove, the train pipe pressure being increased rapidly enough to hold the triple valve piston in its uppermost or release position during the time that fluid from the supplemental reservoir is flowing into the valve chamber.

If, after an application of the brakes, it is desired to produce a graduated release, the pressure in the train pipe is increased only sufficiently to cause the triple valve to move to release position; then as the ports 41 and 42, which in this position of the valve are connected by the cavity 40, register with ports 43 and 44 an escape of fluid from the brake cylinder to the atmosphere will occur, but at the same time the port 47 registers with port 48 and the fluid under the greater pressure of the supplemental reservoir flows into the valve chamber and raises the pressure therein and in the auxiliary reservoir sufficiently above that of the train pipe to cause the piston with its graduating valves to move downward until the head of the piston stem 34 engages the main slide valve. This movement closes the feed groove and moves the auxiliary slide valve so as to close the ports 41, 42, and 47, thus cutting off the exhaust from the brake cylinder, and the flow from the supplemental reservoir to the valve chamber. This operation may be repeated several times or until the pressures are equalized in the reservoirs.

When the piston 32 makes a complete downward traverse and compresses the spring 35, as in emergency application, the port 50 is uncovered and the cavity 54 in the face of the main slide valve connects the ports 48 and 43, thus establishing communication from both the auxiliary reservoir and the supplemental reservoir to the brake cylinder.

It will thus be seen that the auxiliary slide valve 38 constitutes in effect a graduating release valve operated by the triple valve piston and adapted to have a slight movement relative to the main slide valve. By means of this construction the braking pressure may be graded up or down at will in service applications, while in emergency applications a greatly increased braking power is provided.

According to the modified form of triple valve device shown in Sheet 3 of the drawings, the ports are somewhat differently arranged and a graduating stem valve 55, located in the upper end of the main slide valve and secured to piston stem 34, is used in lieu of the port 46 through the auxiliary slide valve for controlling the port or passage 47 in the main slide valve, but otherwise the operation of this form of my improvement is substantially the same as that above described.

The two graduating valve stems 36 and 55 are located on opposite sides of the center line of the main slide valve and are secured to the piston stem 34 in such positions that when one is closed on its seat in the main slide valve the other will be withdrawn from its seat, as clearly indicated in Fig. 13. The port 41 is located above the port 42 and the cavity 40 in the auxiliary slide valve is also arranged vertically instead of horizontally as in the first modification. The ports or passages 51 and 47 in the main slide valve communicate with the valve chamber through openings in the side of the valve in the usual way, as indicated in the dotted lines. When the valve piston is moved to release position the graduating release valve stem 55 is withdrawn from its seat in the main slide valve and the supplemental reservoir is put in communication with the valve chamber through the opening in the side of the valve, ports 47, and 48, passage 49 and pipe 28, at the same time cavity 40 of the auxiliary slide valve registers with ports 41 and 42 and the operation is substantially the same as before described in connection with Sheet 2 of the drawings.

The modified form of valve device shown on Sheet 4 corresponds with that of Sheet 2, except that the graduating slide valve 56 is substituted in the place of graduating stem 36 for controlling the port 51 through the main slide valve. The valves 56 and 38 might be formed in a single piece if desired, but such a construction would make the unbalanced surface of the valve exposed to the fluid pressure unnecessarily large and it is preferable to form them in separate parts secured to or operated by the main piston stem as shown.

A check valve 57 may be inserted in the passage leading from port 50 to the passage 52 in order to prevent back flow from the brake cylinder to the valve chamber in emergency applications.

Heretofore it has been proposed to combine a supplemental reservoir with an automatic brake apparatus and a valve device having a single valve moved positively by its operating piston for securing graduating effects both in the application and release of the brakes. Such a construction has been found to be defective, however, for the reason that no means are provided for arresting the movement of the valve at certain intermediate positions, except the resulting variations of pressure on the opposite sides of the operating piston due to the opening or closing of certain ports, and the valve is liable to move too far and thus destroy the delicacy of the graduating effect. One of the principal objects of my invention is to overcome this defect by providing an automatic valve device in which there is sufficient lost motion between the main valve and the piston stem to allow for the relative movement of a separate graduating valve for controlling the release, which valve is subject to a less resistance in its movement than that of the main valve. It will be observed that the graduation of the release comprises two functions, i. e., cutting off the admission of fluid from the supplemental reservoir to the valve chamber, and the closing of the exhaust from the brake cylinder to the atmosphere; also that each of the three modified forms of valve device shown in the drawings is adapted to secure this result.

According to the modifications illustrated on Sheets 2 and 4, the auxiliary slide valve 38 constitutes the graduating valve for performing both of these functions, while in the modified form shown on Sheet 3, the auxiliary slide valve graduates the release from the brake cylinder, while the valve 55 graduates the admission of fluid from the supplemental reservoir to the valve chamber.

While I have shown my improvement applied to an ordinary form of plain triple valve it is to be understood that it is not limited to such application, since it may also be employed in connection with any other form of triple valve device without departing from the scope of the invention.

It will also be evident that the supplemental reservoir may represent any additional source of pressure other than the auxiliary reservoir, and that said supplemental reservoir may be charged in any desired manner.

Having now described my invention, what I claim as new and desire to secure by Letters Patent is:—

1. In a fluid pressure brake, the combination with a train pipe, auxiliary reservoir, and brake cylinder, of a supplemental reservoir, and a valve device having a movable abutment operated by variations in fluid pressure, a main valve for the brake cylinder exhaust actuated by said abutment, and an auxiliary valve having an independent movement relative to the main valve for controlling the release from the brake cylinder.

2. In a fluid pressure brake, the combination with a train pipe, auxiliary reservoir, brake cylinder and supplemental reservoir, of a valve device having a movable abutment operated by variations in fluid pressure, a main valve actuated by said abutment, and an auxiliary valve for controlling communication from the supplemental reservoir to one side of said abutment.

3. In a fluid pressure brake, the combination with a train pipe, auxiliary reservoir, brake cylinder and supplemental reservoir, of a valve device having a movable abutment operated by variations in fluid pressure, a main valve actuated by said abutment, and an auxiliary valve device for controlling the supply from the supplemental reservoir to one side of the abutment and the release from the brake cylinder.

4. In a fluid pressure brake, the combination with a train pipe, auxiliary reservoir, brake cylinder, and supplemental reservoir, of a valve device having a movable abutment operated by variations in fluid pressure, a main valve actuated by said abutment, and an auxiliary valve also actuated by said abutment, said auxiliary valve having a movement independent of the main valve and adapted to control communication from the supplemental reservoir to one side of said abutment.

5. In a fluid pressure brake, the combination with a train pipe, auxiliary reservoir, brake cylinder, and supplemental reservoir, of a valve device having a movable abutment operated by variations in fluid pressure, a main valve actuated by said abutment but having a lost motion relative thereto, and an auxiliary valve positively actuated by said abutment for controlling the release from the brake cylinder.

6. In a fluid pressure brake, the combination with a train pipe, auxiliary reservoir, brake cylinder and supplemental reservoir, of a valve device having a movable abutment operated by variations in fluid pressure, a main valve actuated by said abutment but mounted to have a lost motion relative thereto, and an auxiliary valve positively actuated by said abutment for controlling communication from the supplemental reservoir to one side of said abutment.

7. In a fluid pressure brake, the combination with a train pipe, auxiliary reservoir, brake cylinder, and supplemental reservoir, of a valve device comprising a movable abutment operated by variations in fluid pressure, a main valve actuated by said abutment but having a lost motion relative thereto, and an auxiliary valve positively actuated by said abutment for controlling communication from the supplemental reservoir to one side of the abutment and from the brake cylinder to the atmosphere.

8. In a fluid pressure brake, the combination with a train pipe, auxiliary reservoir, brake cylinder and supplemental reservoir, of a triple valve device having a piston, a main valve provided with a port communicating with the supplemental reservoir, and an auxiliary valve having a movement relative to the main valve and controlling the port communicating with the supplemental reservoir.

9. In a fluid pressure brake, the combination with a train pipe, auxiliary reservoir, brake cylinder and supplemental reservoir, of a triple valve device having a piston, a main valve operated thereby and provided with ports communicating with the brake cylinder and the exhaust, and an auxiliary valve having a movement relative to the main valve for controlling the exhaust from the brake cylinder through said ports.

10. In a fluid pressure brake, the combination with a train pipe, auxiliary reservoir, brake cylinder and supplemental reservoir, of a triple valve device having a piston, a main valve operated thereby and provided with ports communicating with the supplemental reservoir, the brake cylinder and the exhaust, and an auxiliary valve slidingly mounted on the main valve for controlling said ports.

11. In a fluid pressure brake, the combination with a train pipe, auxiliary reservoir, brake cylinder and supplemental reservoir, of a triple valve device having a piston, a main valve, a graduating valve for controlling the supply from the auxiliary reservoir to the brake cylinder in service applications, and another graduating valve for controlling the communication from the supplemental reservoir to one side of the piston.

12. In a fluid pressure brake, the combination with a train pipe, auxiliary reservoir, brake cylinder and supplemental reservoir, of a triple valve device having a piston, a main valve, a graduating valve for controlling communication from the auxiliary reservoir to the brake cylinder in service applications, and another graduating valve, or valves controlling communication from the supplemental reservoir to the valve chamber and from the brake cylinder to the atmosphere.

13. In a fluid pressure brake, the combination with a train pipe, auxiliary reservoir, and brake cylinder, of an additional reservoir or source of pressure, and a valve device comprising a movable abutment, main valve and auxiliary valve operated by variations in train pipe pressure for controlling the supply and release of air to and from the brake cylinder, and communication from the additional reservoir to the auxiliary reservoir.

14. In a fluid pressure brake, the combination with a train pipe, auxiliary reservoir, and brake cylinder, of an additional reservoir or source of pressure, and a valve device comprising a movable abutment, main valve and auxiliary valve operated by variations in train pipe pressure and having ports adapted in one position to open communication from the additional reservoir to the auxiliary reservoir and from the brake cylinder to the exhaust.

15. In a fluid pressure brake, the combination with a train pipe and brake cylinder, of another source of fluid pressure, and a valve device having a main valve, an auxiliary valve and a movable abutment operated by variations in train pipe pressure on one side of said abutment for controlling the brake cylinder pressure and communication from said other source of pressure to the opposite side of said abutment.

16. In a fluid pressure brake, the combination with a train pipe and brake cylinder, of another source of fluid pressure, and a valve device having a main valve, an auxiliary valve and a movable abutment subject to the opposing pressures of the train pipe and an auxiliary chamber for actuating said auxiliary valve to control the release from the brake cylinder and the supply from said additional source of pressure to the auxiliary chamber side of said abutment.

17. In a fluid pressure brake, the combination with a train pipe and brake cylinder, of another source of fluid pressure, and a valve device having a piston subject on one side to train pipe pressure, a main valve, an auxiliary valve operated by said piston and having a movement relative to the main valve for controlling the brake cylinder exhaust and the supply of fluid from said additional source to oppose the action of the train pipe pressure on said piston.

In testimony whereof I have hereunto set my hand.

ROBERT A. PARKE.

Witnesses:
 THOS. H. BROWN,
 WM. H. CAPEL.